Patented Feb. 24, 1942

2,273,849

UNITED STATES PATENT OFFICE 2,273,849

PARASITICIDAL MATERIAL

Albert K. Epstein and Benjamin R. Harris, Chicago, Ill.

No Drawing. Application April 1, 1940, Serial No. 327,251

20 Claims. (Cl. 167—22)

This invention relates to new and useful fungicides, insecticides, or parasiticides and the like and is particularly concerned with improved materials which are employed in the treatment of plants, household animals and for combating fungus diseases and insect infestations.

It is well known that insecticidal, fungicidal and similar compositions have a widespread use for horticultural and agricultural purposes, where they are used in the form of sprays or the like, for the combating of plant diseases, for the extermination of insects and parasites, for use as sheep dips, and for many other similar purposes. In the class of insecticides, it is known that certain types of such materials or compositions are stomach or internal poisons. Insects of the type which eat plant tissues are destroyed by distributing over the surfaces of the plant material such stomach or internal poisons with the result that when such plant material is eaten by the insects, the latter are killed. There is another class of insecticides which destroys the insects by suffocating or paralyzing them. In this case, when the insects suck or pierce the epidermis of a leaf or plant tissue having distributed thereover the particular type of insecticide in question, said insecticide comes into direct contact with the body or tissues of the insects thereby inducing suffocation and paralysis thereof. Still another class of insecticides is ovicidal and destroys the eggs of the insects by coming into direct contact with said eggs. This invention relates, in general, to new fungicides and insecticides or parasiticides having utility in the art for various purposes for which heretofore known parasiticides have been employed.

One object of the present invention is the provision of a new class of parasiticidal substances.

Another object is the provision of a new class of parasiticidal substances which are in general of relatively simple structure and can be cheaply made in commercial quantities.

Another object is the provision of a class of parasiticidal substances of the character set forth hereinafter which have particular utility alone or in combination with other parasiticides, and may be dissolved in mineral oils or dispersed or emulsified with oil or oleaginous materials and water.

Other objects and features of the invention will be apparent from a consideration of the following detailed description.

The novel parasiticidal substances of the present invention comprise, in general, halogeno-carboxylic acid amides of derivatives of alcohol amines or hydroxy-alkyl amines, particularly of lipophile derivatives of said alcohol amines or hydroxy-alkyl amines.

One sub-class of the novel parasiticidal substances falls within the scope of the general formula:

wherein R is an organic radical preferably containing at least four carbon atoms, alk stands for hydrocarbon, for example, alkylene or arylene such as ethylene or phenylene, Y is hydrogen, alkyl, cycloalkyl, alkoxyl, aralkyl, aryl, or alkylol, Z is preferably a hydrocarbon residue, containing preferably less than six carbon atoms, hal is halogen, and $n$, $m$ and $w$ are whole numbers, $n$ being preferably one, and $m$ and $w$ being preferably from one to four.

A more limited aspect of this sub-class of parasiticidal substances may be represented by the general formula

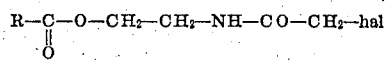

wherein R is a hydrocarbon radical or substituted hydrocarbon radical containing at least seven and preferably from eleven to seventeen carbon atoms, and hal is halogen.

The radical R in the above formulae may be of aliphatic, cycloaliphatic, aromatic or aromatic-aliphatic character, and may contain substituent groups such as amino, hydroxy, halogen, sulphate, sulphonic, phosphate, carboxyl, nitrile, and the like, as will be pointed out hereinafter, but it is particularly preferred that it be unsubstituted aliphatic or fatty and contain from eight to fourteen carbon atoms. Z and alk, likewise, may contain substituent groups such as amino, hydroxy, halogen, sulphate, sulphonic, phosphate, carboxyl, nitrile, and the like, and the sequence of carbon atoms therein may be interrupted by O, S, C=O, NH, NR', where R' is alkyl, and the like.

In order that the nature of the invention may become more apparent, there are listed hereinbelow representative parasiticidal substances which fall within the scope of the invention. It will be understood that such substances may be utilized in the pure or impure state or in the form of reaction mixtures containing predominant or substantial proportions of said substances or in the form of mixtures of any two or more of said substances. It will further be appreciated that the higher molecular weight acyl groups, the hydroxy amine groups and the halogeno-carboxylic acid groups which enter into the formation of the various substances may be interchanged without departing from the spirit of the invention:

(1) $C_{11}H_{23}-\underset{\underset{O}{\|}}{C}-O-CH_2-CH_2-NH-\underset{\underset{O}{\|}}{C}-CH_2-Cl$ (2) $C_{17}H_{35}-\underset{\underset{O}{\|}}{C}-O-CH_2-CH_2-NH-\underset{\underset{O}{\|}}{C}-CH_2-Br$ (3) $C_{15}H_{27}-\underset{\underset{O}{\|}}{C}-O-CH_2-CH_2-CH_2-NH-\underset{\underset{O}{\|}}{C}-CH_2-Cl$ (4) $C_7H_{15}-\underset{\underset{O}{\|}}{C}-O-C_2H_4-O-C_2H_4-NH-\underset{\underset{O}{\|}}{C}-CH_2-Cl$ (5) $C_{11}H_{23}-\underset{\underset{O}{\|}}{C}-O-CH_2-\underset{\underset{OH}{|}}{CH}-CH_2-NH-\underset{\underset{O}{\|}}{C}-CH_2-Cl$ (6) $C_{10}H_{21}-\underset{\underset{O}{\|}}{C}-O-CH_2-CH_2-NH-\underset{\underset{O}{\|}}{C}-CH_2-CH_2-Cl$ (7) $C_{12}H_{25}-O-CH_2-CH_2-NH-\underset{\underset{O}{\|}}{C}-CH_2-Cl$ (8) $C_{11}H_{23}-\underset{\underset{O}{\|}}{C}-O-CH_2-CH_2-CH_2-NH-\underset{\underset{O}{\|}}{C}-CH_2-Br$ (9) $C_{19}H_{29}-\underset{\underset{O}{\|}}{C}-O-CH_2-CH_2-NH-\underset{\underset{O}{\|}}{C}-\underset{\underset{Cl}{|}}{CH}-CH_3$
(Abietic acid)

(10) $CH_3-(CH_2)_7-\underset{\underset{OH}{|}}{CH}-\underset{\underset{O}{\|}}{C}-O-C_2H_4-NH-\underset{\underset{O}{\|}}{C}-CH_2-Cl$

(11) 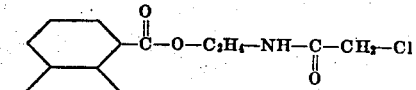$-\underset{\underset{O}{\|}}{C}-O-C_2H_4-NH-\underset{\underset{O}{\|}}{C}-CH_2-Cl$

(12) 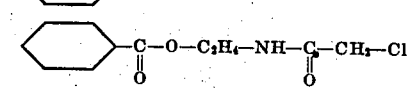$-\underset{\underset{O}{\|}}{C}-O-C_2H_4-NH-\underset{\underset{O}{\|}}{C}-CH_2-Cl$

(13) $\underset{H_2C}{\overset{CH_2-CH_2}{\diagup}}\underset{CH_2-CH_2}{\diagdown}CH-\underset{\underset{O}{\|}}{C}-O-C_2H_4-NH-\underset{\underset{O}{\|}}{C}-CH_2-CH_2-Cl$

(14) $C_{11}H_{23}-\underset{\underset{O}{\|}}{C}-O-CH_2-CH_2-CH_2-CH_2-NH-\underset{\underset{O}{\|}}{C}-CH_2-Cl$

(15) $C_{16}H_{33}-O-CH_2-CH_2-NH-\underset{\underset{O}{\|}}{C}-CH_2-CH_2-CH_2-CH_2-Cl$

(16) $C_8H_{17}-O-C_2H_4-O-C_2H_4-NH-\underset{\underset{O}{\|}}{C}-CH_2-Cl$

(17) $C_{11}H_{23}-\underset{\underset{O}{\|}}{C}-O-C_2H_4-NH-C_2H_4-NH-\underset{\underset{O}{\|}}{C}-CH_2-Cl$

(18) $C_{15}H_{31}-\underset{\underset{O}{\|}}{C}-O-C_2H_4-NH-\underset{\underset{O}{\|}}{C}-CH_2-(CH_2)_4-CH_2-Cl$

(19) $CH_3-(CH_2)_7-\underset{\underset{Cl}{|}}{CH}-\underset{\underset{Cl}{|}}{CH}-(CH_2)_7-\underset{\underset{O}{\|}}{C}-O-C_2H_4-NH-\underset{\underset{O}{\|}}{C}-CH_2-Cl$

(20) $C_{11}H_{23}-\underset{\underset{O}{\|}}{C}-O-C_2H_4-O-C_2H_4-NH-\underset{\underset{O}{\|}}{C}-CH_2-CH_2-\underset{\underset{Cl}{|}}{CH}-CH_3$

(21) $C_{13}H_{27}-\underset{\underset{O}{\|}}{C}-O-C_2H_4-NH-C_2H_4-NH-C_2H_4-NH-\underset{\underset{O}{\|}}{C}-CH_2-Cl$

(22) $C_{11}H_{23}-\underset{\underset{O}{\|}}{C}-O-C_2H_4-\underset{\underset{C_2H_4OH}{|}}{N}-\underset{\underset{O}{\|}}{C}-CH_2-Cl$

(23) $C_{13}H_{27}-\underset{\underset{O}{\|}}{C}-O-C_2H_4-\underset{\underset{C_2H_4OH}{|}}{N}-\underset{\underset{O}{\|}}{C}-CH_2-Br$

(24) $C_{11}H_{23}-\underset{\underset{O}{\|}}{C}-O-$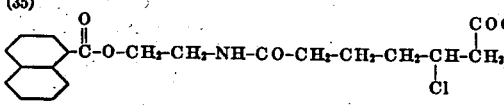$-NH-\underset{\underset{O}{\|}}{C}-CH_2-Cl$

(25) $C_{17}H_{33}-\underset{\underset{O}{\|}}{C}-O-C_2H_4-S-C_2H_4-NH-\underset{\underset{O}{\|}}{C}-CH_2-Cl$
(Oleyl)

(26) $C_{17}H_{33}-\underset{\underset{O}{\|}}{C}-O-C_2H_4-NH-\underset{\underset{O}{\|}}{C}-\underset{\underset{Cl}{|}}{CH}-\underset{\underset{Cl}{|}}{CH}-CH_3$
(Oleyl)

(27) $C_{11}H_{23}-\underset{\underset{O}{\|}}{C}-O-C_2H_4-NH-\underset{\underset{O}{\|}}{C}-CH_2-\underset{\underset{Cl}{|}}{CH}-CH_2-CH_2-CH_3$

(28) $C_{11}H_{23}-\underset{\underset{O}{\|}}{C}-O-CH_2-CH_2-NH-CO-CH_2-\underset{\underset{Cl}{|}}{CH}-COONa$

(29) $C_{17}H_{35}-\underset{\underset{O}{\|}}{C}-O-CH_2-CH_2-NH-CO-CH_2-\underset{\underset{Br}{|}}{CH}-COOK$

(30) $C_{13}H_{27}-\underset{\underset{O}{\|}}{C}-O-CH_2-CH_2-NH-CO-CH_2-\underset{\underset{Br}{|}}{CH}-COONH_4$

(31) $C_{17}H_{35}-\underset{\underset{O}{\|}}{C}-O-CH_2-\underset{\underset{OH}{|}}{CH}-CH_2-NH-CO-CH_2-\underset{\underset{Cl}{|}}{CH}-COOK$

(32) $C_{12}H_{25}-O-CH_2-CH_2-NH-CO-CH_2-\underset{\underset{Cl}{|}}{CH}-COOK$

(33) $C_{11}H_{23}-\underset{\underset{O}{\|}}{C}-O-CH_2-CH_2-NH-CO-CH_2-\underset{\underset{Cl}{|}}{CH}-COONa$

(34) $CH_3-(CH_2)_7-\underset{\underset{OH}{|}}{CH}-\underset{\underset{O}{\|}}{C}-O-CH_2-CH_2-NH-CO-CH_2-\underset{\underset{Br}{|}}{CH}-COONa$

(35) 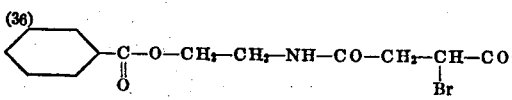$-\underset{\underset{O}{\|}}{C}-O-CH_2-CH_2-NH-CO-CH_2-CH_2-CH_2-\underset{\underset{Cl}{|}}{CH}-\overset{COOK}{CH_2}$

(36) 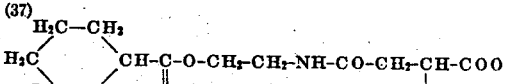$-\underset{\underset{O}{\|}}{C}-O-CH_2-CH_2-NH-CO-CH_2-\underset{\underset{Br}{|}}{CH}-COOK$

(37) $\underset{H_2C}{\overset{H_2C-CH_2}{\diagup}}\underset{H_2C-CH_2}{\diagdown}CH-\underset{\underset{O}{\|}}{C}-O-CH_2-CH_2-NH-CO-CH_2-\underset{\underset{Cl}{|}}{CH}-COONa$

(38) $C_{16}H_{33}-O-CH_2-CH_2-NH-CO-CH_2-\underset{\underset{Cl}{|}}{CH}-COOH$

(39) $C_8H_{17}-O-CH_2-CH_2-NH-CO-CH-\underset{\underset{Cl}{|}}{CH}-COONa$ (with OH under first CH)

(40) $CH_3-(CH_2)_7-CHCl-CHCl-(CH_2)_7-\underset{\underset{O}{\|}}{C}-O-CH_2-CH_2$
                                                                                        $|$
                                                                                       $NH$
                                                                                        $|$
                                                                                       $CO$
                                                                                        $|$
                                                                                       $CH_2$
                                                                                        $|$
                                                                                       $Cl-CH$
                                                                                        $|$
                                                                                       $COOK$

(41) $C_{11}H_{23}-\underset{\underset{O}{\|}}{C}-O-CH_2-CH_2-O-CH_2-CH_2-NH-CO-CH_2-\underset{\underset{Cl}{|}}{CH}-COONa$

(42) $C_{13}H_{27}-\underset{\underset{O}{\|}}{C}-O-CH_2-CH_2-NH-CH_2-CH_2-NH-CH_3$
                                                                                  $|$
                                                                                 $CH_2$
                                                                                  $|$
                                                                                 $NH$
                                                                                  $|$
                                                                                 $CO$   $COONa$
                                                                                  $|$    $|$
                                                                                 $CH_2-CH$
                                                                                         $|$
                                                                                        $Cl$

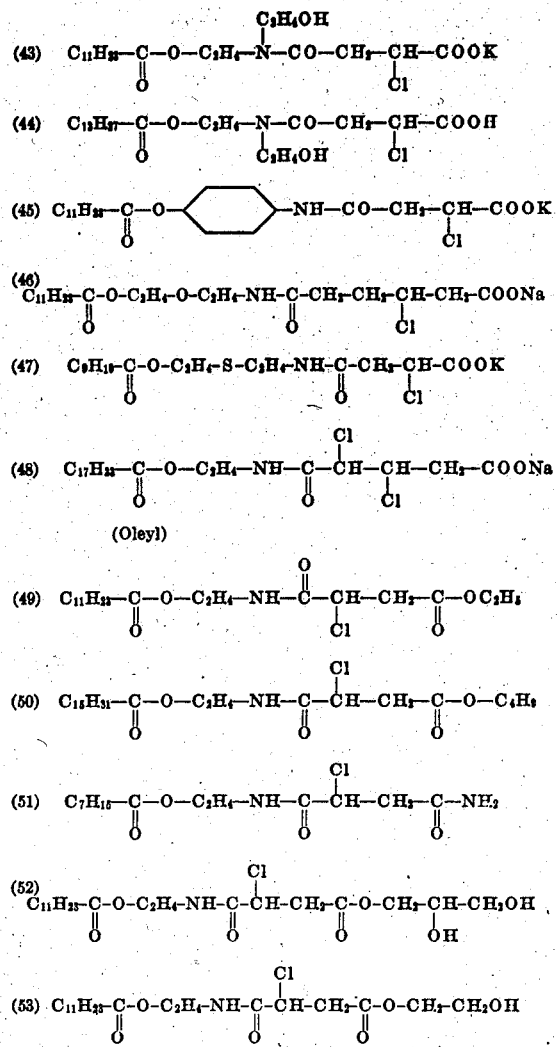

In general, the parasiticidal substances are prepared by initially reacting a primary or secondary alcohol amine or alkylolamine, including corresponding polyamines, for example, monoethanolamine, with a halogen-carboxylic acid or derivative thereof under conditions such as to insure a substantial yield of amide. If the halogen-carboxylic acid is employed in the form of an ester, for example, methyl chloracetate, and low temperatures are employed, of the order of about —10 degrees C. to about +10 degrees C., excellent yields of amide are obtained. The resulting amide is then reacted with a higher molecular weight organic acid or halide thereof to produce the ester. The process is preferably carried out in a non-aqueous medium, namely, one which is substantially devoid of water, this procedure producing the best yields and resulting in other advantages rendering the process more economical. By a non-aqueous medium is meant one where either the two reactants may be present or one of them may be in suspension in which latter case it may be regarded as a non-aqueous diluent. Again, an extraneous non-aqueous material such as methyl alcohol or ethyl alcohol may be added to the reaction mass during the amidification step to serve as a non-aqueous diluent.

In the case of the halogeno-polycarboxylic acid amide derivative, another method of preparing said parasiticidal substances comprises reacting an unsaturated polycarboxylic acid such as, for example, maleic acid, maleic anhydride, or fumaric acid, with a non-tertiary hydroxy-alkyl amine to form the amide. The resulting compound is treated with halogen, halogen acid such as hydrochloric acid, hydrobromic acid, hypochlorous acid or hypobromous acid, whereby halogen is introduced into the molecule at a double bond of the polycarboxylic acid radical. The lipophile group may then be introduced into the molecule by means of an acyl halide or the like.

The following examples are illustrative of methods which have been found suitable for preparing various of the parasiticidal substances which are disclosed herein. It will be appreciated that other methods may be utilized and that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

*Example A*

(1) 122 grams of ethyl chloracetate were added slowly to a 25% aqueous solution containing 122 grams of monoethanolamine, the reaction being conducted at a temperature of 0 degrees C. to 10 degrees C. At the end of 15 minutes the reaction appeared to be complete. Approximately 126 grams of oxalic acid were then added to neutralize the excess of ethanolamine, maintaining preferably a temperature of 0 degrees C. to 10 degrees C. The water present in the reaction mixture was then evaporated off on the water bath and 1000 grams of iso-propyl alcohol were added. The mass was then filtered, the monoethanolamine oxalate being insoluble, and the alcohol was distilled off from the filtrate on a water bath under vacuum. (The excess monoethanolamine may be removed, if desired, in any other manner as, for example, by distillation under vacuum.) The resulting product, consisting essentially of the N-beta-hydroxyethyl, chloracetamide, was a semi-viscous liquid.

(2) 14.8 grams of the N-beta-hydroxyethyl, chloracetamide, prepared as described in part (1) hereof, and 18.8 grams of lauroyl chloride were stirred vigorously while warming to 60 degrees C. over a period of 10 minutes. Approximately 5 minutes later, a vigorous reaction started with the evolution of hydrochloric acid. The resulting product, namely, the lauric acid ester of N-beta-hydroxyethyl, chloracetamide, was a solid, soft, waxy material.

*Example B*

(1) To 6.1 grams of monoethanolamine dissolved in 50 cc. of water and maintained in an ice bath there were added dropwise, with vigorous stirring, 21.6 grams of alpha-brom propionyl bromide. When approximately half of the latter had been added, the dropwise addition of 46.5 cc. of 2N NaOH was begun, the rest of the alpha-brom propionyl bromide being added dropwise meanwhile. The reaction was completed in 15 minutes and the mass was then evaporated on the water bath. It was then extracted with 500 cc. of boiling isopropyl alcohol and the mineral salts, such as sodium bromide, were filtered off. The alcohol was then evaporated and the reaction product, which was a viscous liquid, consisted essentially of a compound having the formula

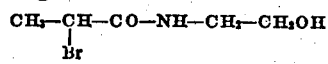

(2) 10 grams of the amide produced as described in part (1) hereof and 8 grams of lauroyl chloride were heated together at 50 degrees C. for approximately 5 minutes with vigorous stirring. When hydrochloric acid was no longer evolved, the reaction was terminated. The resulting compound was the lauric acid ester of the amide produced in part (1) hereof.

Example C 14 grams of the N-beta-hydroxyethyl, chloracetamide, produced as described in part (1) of Example A hereinabove, and 14 grams of caprylyl chloride were heated to 50 degrees C. and stirred vigorously for several minutes. The reaction was considered complete when no more hydrochloric acid was evolved. The resulting reaction product contained a substantial proportion of the caprylic acid ester of N-beta-hydroxyethyl, chloracetamide.

Example D (1) To 217 grams (2 mols) of methyl chloracetate 62 grams (1 mol) of monoethanolamine were added slowly with stirring, the temperature of the mixture being kept at approximately 0 degrees C. The addition of the monoethanolamine was made over a period of about 1¼ hours, a small amount of finely divided solid carbon dioxide being added to the reaction product to help maintain the temperature at about 0 degrees C. The reaction product was then subjected to a vacuum at a temperature of 20 degrees C. to 50 degrees C. and at an absolute pressure of 12 mm. to 70 mm. in order to remove the methyl alcohol which formed during the reaction, the carbon dioxide, and at least most of the excess methyl chlor acetate. Approximately 180 grams of a reaction product was obtained consisting essentially of the chloracetamide of monoethanolamine (HO—C$_2$H$_4$—NH—CH$_2$Cl)

(2) To the reaction product of part (1) hereof, 330 grams of lauroyl chloride (approximately 63% pure, the balance comprising largely lauric acid) were added and the mass was heated, with stirring and under vacuum, for one hour at a temperature ranging from 60 degrees C. to 95 degrees C., in order to remove the hydrochloric acid which formed during the reaction. The reaction mass was then washed four times with tap water at 65 degrees C. until free of hydrochloric acid.

Example E (1) 108.5 grams of methyl chlor acetate were dissolved in 327 grams of methyl alcohol and there were added thereto, slowly and with stirring, 74.4 grams of monoethanolamine. The reaction mixture was maintained at a temperature of about −10 degrees C. for approximately 1¼ hours. The temperature was then allowed to rise over a period of about 1 hour to +10 degrees C. at which stage the amidification reaction was approximately 98% complete. The slight excess of monoethanolamine was then removed by adding slowly, and with stirring, 17.32 grams of oxalic acid dissolved in 30 cc. of methyl alcohol. The precipitated oxalic acid salt of monoethanolamine was then filtered off and the methyl alcohol was evaporated off under vacuum from the filtrate. At room temperature, the reaction product was a viscous, pale straw to amber colored liquid and consisted essentially of the chloracetamide of monoethanolamine.

(2) 124 grams of the reaction product of part (1) hereof were mixed with 176.5 grams of 90% pure lauroyl chloride and the mixture was heated, with stirring and under vacuum, for 1 hour at about 70 degrees C. until no more hydrochloric acid was driven off. The reaction mass was then washed twice, each time with 4 liters of water at 60 degrees C. until the wash water was free of hydrochloric acid.

Example F (1) To 1085 grams of methyl chloracetate, maintained at about 0 degrees C., there were added, slowly and with stirring over a period of about 10 minutes, 525 grams of diethanolamine also maintained at a temperature of about 0 degrees C. The temperature rose to about +10 degrees C. and the reaction mass was then allowed to stand whereupon the temperature rose to 24 degrees C. The reaction mass was then allowed to stand at approximately this temperature for twelve hours. The methyl alcohol which formed during the reaction and the excess methyl chloracetate were distilled off in vacuo at a temperature of about 60 degrees C. The reaction product contained a substantial proportion of the chloracetamide of diethanolamine.

(2) To 94 grams of the reaction product of part (1) hereof there were added dropwise and with stirring 99 grams of lauroyl chloride, the addition being made over a period of about 20 minutes and while maintaining the reaction at a temperature ranging from 80 degrees C. to 100 degrees C. The final reaction product was a clear, light amber, semi-viscous material containing a substantial proportion of a compound having the following formula:

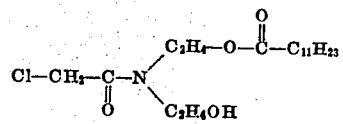

Example G (1) 10 grams of maleic anhydride were added slowly, with stirring, to a solution of 6.2 grams of monoethanolamine and 25 cc. of dry dioxane. The reaction mixture, after a period of about 10 minutes, was cooled to 25 degrees C. on a cold water bath.

(2) To the reaction product of part (1) hereof, 22 grams of lauroyl chloride were added dropwise, with stirring, over a period of about ½ hour, the reaction mixture being maintained at about 30 degrees C. in a cold water bath.

(3) To the reaction mass produced in part (2) hereof, chlorine gas was slowly bubbled therethrough for a period of about 4 hours or until a total of about 7 grams of chlorine was absorbed.

Example H (1) 12.4 grams of monoethanolamine were dissolved in 50 cc. of water and there were added thereto, dropwise and with stirring and cooling in an ice bath, 40 grams of dibrom succinyl bromide. During the addition of the di-brom succinyl bromide, 8 grams of sodium hydroxide, previously dissolved in 50 cc. of water, were gradually added. The additions of the di-brom succinyl bromide and the solution of the sodium hydroxide took place over a period of about ½ hour.

(2) To the reaction mass of part (1) hereof, 42 grams of lauroyl chloride were slowly added, and simultaneously therewith a solution of 8 grams of sodium hydroxide and 50 cc. of water was slowly added, the reaction mass being maintained in an ice bath during the addition. The oily reaction product was taken up with 100 cc. of ethyl ether and anhydrous sodium sulphate was mixed therewith in order to dry the product. The salts were then filtered off and the ether evaporated, the resulting residue being a reddish oil.

The organic radical represented by R in the general formulae may, as stated, be derived from various sources. Among such sources may be mentioned straight chain and branched chain carboxylic, aliphatic, and fatty acids, saturated and unsaturated, such as butyric acid, caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as 1-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acids and abietic acid; aromatic acids such as phthalic acid, benzoic acid, naphthoic acid, pyridine carboxylic acids; hydroxy aromatic acids such as salicylic acid, hydroxy benzoic and naphthoic acids, and the like; and substitution and addition derivatives, particularly halogen substitution and addition derivatives of the aforementioned carboxylic substances. It will be understood that mixtures of any two or more of said acids may be employed if desired.

In those cases where ethers are prepared, the higher molecular weight organic radical is derived from alcoholates of alcohols corresponding to the higher molecular weight acids referred to hereinabove.

The halogeno-carboxylic acids which, in the form of their esters, particularly with methyl alcohol, are reacted with the primary and secondary alcohol amines or alkylolamines may be selected from a relatively large class including mono-, di-, and poly-carboxylic derivatives as, for example, mono chloracetic acid, mono bromacetic acid, mono iodo acetic acid, alpha-chlor propionic acid, alpha-brom propionic acid, alpha-chlor butyric acid, alpha-bromo capric acid, mono-chlor succinic acid, di-chlor succinic acid, mono-chlor succinyl chloride, di-chlor succinyl chloride, di-chlor glutaric acid, and the corresponding halogeno derivatives of malonic acid, citraconic acid, mesaconic acid, itaconic, mucic acid, adipic acid, pimelic acid, sebacic acid, suberic acid, azelaic acid, aconitic acid, phthalic acid, and the like. Of special utility, as previously indicated, are methyl alcohol esters of the halogeno acetic acids, particularly, methyl chlor acetate.

The non-tertiary hydroxy amines which are reacted with the acetic acid or the like to produce the intermediate amide include, among others, by way of example, monoethanolamine, diethanolamine, mono-propanolamine, dipropanolamine, mono-butanolamine, dibutanolamine, mono-pentanolamine, dipentanolamine, mono-hexanolamine, dihexanolamine, ethyl mono-ethanolamine; mono-ethyl ether of diethanolamine; mono-cyclohexyl, beta-hydroxy-ethyl amine; 2 - methylamino - propan - diol - 1,3; 1 - phenylamino - propan - diol - 2,3; 1 - hydroxy - ethylamino - 2, methoxy - propanol - 3; 2-N-methylamino-propan-diol-1,3; monoethanol monopropanolamine, monoethanol monobutanolamine, glycerol mono-amines, namely, 1-amino-2,3-propanediol and 2-amino-1,3-propanediol; diglycerol - amine; hydroxylamine ($H_2N-OH$) and derivatives thereof such as result from replacement of one amine hydrogen by an alkyl such as methyl, ethyl, propyl, butyl and the higher homologues; hydroxy amines, particularly secondary hydroxy amines, derived from polyhydric alcohols, including sugars and sugar alcohols such as dextrose, sucrose, sorbitol, mannitol and dulcitol,

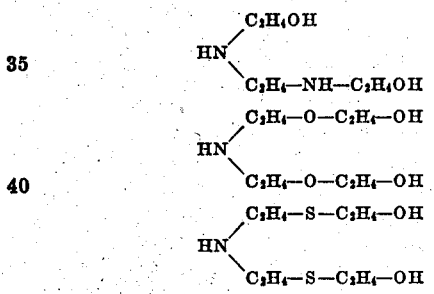

and the like; 2 - amino - 2 - methyl-1,3-propanediol; trimethylol amino methane; 2-amino-2-n-propyl - 1,3 - propanediol; 2 - amino-2-isopropyl-1,3-propanediol; 2-amino-2-methyl-1,4-butanediol; 2-amino-2-methyl-1,5-pentanediol; 2-amino-2-ethyl-1,3-propanediol; 2-amino-2-ethylol-1,3-propanediol; 2-amino-2-methyl-1,6-hexanediol; 1-amino-1,1-dimethyl ethanol; trimethylol amino-methyl methane; trimethylol amino-methylol methane. The glycerol monoamines and the related hydroxy amines such as various of those disclosed hereinabove may be prepared by various procedures and in different ways. Many of them are conveniently produced by nitrating paraffin hydrocarbons, substituting methylol groups for hydroxy on the carbons to which the nitro groups are attached, and then reducing the nitro groups to amine groups. These amine groups may be further alkylated or otherwise substituted if desired. Polymerized non-tertiary hydroxy amines or polymerized hydroxy amines containing hydrogen directly attached to nitrogen and prepared, for example, by polymerizing monoethanolamine or diethanolamine or mixtures thereof, or other hydroxy amines such as those mentioned hereinabove, particularly in the presence of a catalyst such as sodium hydroxide or the like. The preparation of polymerized hydroxy amines is disclosed, for example, in United States Patent No. 2,178,173; and homologues and substitution derivatives of the above-mentioned hydroxy amines. Because of commercial and other considerations, mono- and di-ethanolamine are especially desirable. It will be understood that the hydroxy amines may be utilized in pure, impure or commercial form.

The substances disclosed hereinabove, as previously described, are particularly effective, although, of course, to varying extents, as insecticides and parasiticides. In practice, it is convenient to disperse the substances in aqueous media by means of emulsifying agents such as soaps or other interface modifiers and their effectiveness may be enhanced by incorporating therewith, in the emulsion, interface modifiers with spreading and penetrating characteristics. Generally speaking, concentrations of about 1 to 1000 and 1 to 3000, depending upon the susceptibility of the insect and the potency of the substance, are usually effective for practical use.

The parasiticidal substances of the invention can be distributed as such, as solutions in organic solvents, preferably more or less concentrated, as concentrated emulsions, or, if desired, in the form of the ultimate emulsions ready for use. In general, the substances are readily soluble or miscible with oleaginous materials such as mineral oils, vegetable oils and the like. They may also be dissolved in organic liquids or solvents such as kerosene or other petroleum distillates, benzene, methyl, ethyl, propyl and butyl mono-ethers of glycols, or ethylene dichloride, to make dilute solutions which may be used as such for insect sprays and the like. If desired, anhydrous wetting agents may be incorporated into these latter solutions, such wetting agents comprising, by way of illustration, the sulphates of aliphatic or fatty alcohols containing from eight to eighteen carbon atoms, the corresponding phosphates and sulpho-carboxylic acid esters; gums, glue, sulfonated oils; alkali metal, ammonium and substituted ammonium or alkylolamine soaps, and the like. The proportions of the parasiticidal agents, the organic liquids, and the anhydrous wetting agents will vary depending upon the potencies and other characteristics thereof, the nature of the parasiticidal problem, and the specific character of the results desired. Those skilled in the art will, in the light of the present description and in view of existing practices in the art, readily be able successfully to practice the invention.

In many instances, it may be advantageous to utilize the novel parasiticidal agents of the present invention in conjunction with one or more known insecticidal or similar materials such as pyrethrum, derris or cube root, rotenone, nicotine salts or synthetic nicotine substitutes, aliphatic, araliphatic, and aromatic thiocyano and isothiocyano compounds, and other compounds having parasiticidal properties. Such practice falls within the scope of the present invention.

Wherever the term "parasiticidal substance" is used in the claims, it will be understood to cover materials having insecticidal or fungicidal or similar properties or properties which serve to inhibit the growth of or destroy insects, insect eggs, fungus growths or similar undesirable plant or animal life. There is also included within the definition of this term such properties as antiseptic, disinfectant and bactericidal.

Wherever the term "higher" is employed as referring to higher molecular weight organic or fatty acids or the like, it will be understood to cover compounds or radicals containing at least six carbon atoms, unless otherwise specifically stated.

We claim:

1. Parasiticidal materials corresponding to the general formula $$(RO)_n-(alk-NY)_m-CO-Z(X)_w$$

wherein R is an organic radical containing at least four carbon atoms, alk is a member selected from the group consisting of alkylene and arylene and substitution products thereof, Z is a member selected from the class consisting of hydrocarbon radicals and substitution products thereof, Y is a member selected from the group consisting of hydrogen, alkyl, cycloalkyl, alkoxyl, aralkyl, aryl, and alkylol, n, m and w are small whole numbers, and X is halogen.

2. Parasiticidal materials corresponding to the general formula

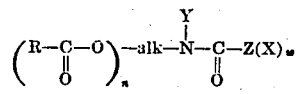

wherein

is an aliphatic acyl radical containing at least eight carbon atoms, alk is a member selected from the group consisting of alkylene and arylene and substitution products thereof, Y is a member selected from the group consisting of hydrogen, alkyl, cycloalkyl, alkoxyl, aralkyl, aryl, and alkylol, Z is a hydrocarbon residue, X is halogen, and n and w are small whole numbers.

3. Parasiticidal materials corresponding to the general formula

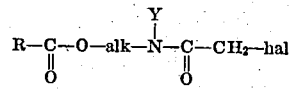

wherein

is an aliphatic acyl radical containing at least eight carbon atoms, alk is alkylene, Y is a member selected from the group consisting of hydrogen, alkyl, cycloalkyl, alkoxyl, aralkyl, aryl, and alkylol, and hal is halogen.

4. Parasiticidal materials corresponding to the general formula $$RO-(alk-NY)_m-CO-ZX$$

wherein R is an organic radical containing at least four carbon atoms, alk is alkylene, Y is a member selected from the group consisting of hydrogen, alkyl, cycloalkyl, alkoxyl, aralkyl, aryl, and alkylol, m is a small whole number, Z is a hydrocarbon residue, and X is halogen.

5. A composition comprising an organic liquid and a parasiticidal material corresponding to the general formula

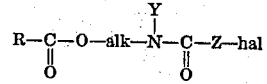

wherein

is an aliphatic acyl radical containing at least eight carbon atoms, alk is alkylene, Y is a member selected from the group consisting of hydrogen, alkyl, cycloalkyl, alkylol, alkoxyl, aralkyl, and aryl, Z is a hdyrocarbon residue and hal is halogen.

6. Parasiticidal materials corresponding to the general formula $$R-\underset{\underset{O}{\|}}{C}-O-C_2H_4-NH-CO-CH_2-hal$$

wherein $$R-\underset{\underset{O}{\|}}{C}$$

is an acyl radical containing at least four carbon atoms, and hal is halogen.

7. Parasiticidal materials corresponding to the general formula $$R-\underset{\underset{O}{\|}}{C}-O-C_2H_4-NY-CO-CH_2-hal$$

wherein $$R-\underset{\underset{O}{\|}}{C}$$

is a fatty acid acyl radical containing from eight to eighteen carbon atoms, Y is a member selected from the group consisting of hydrogen, alkyl, cycloalkyl, alkoxyl, aralkyl, aryl, and alkylol, and hal is halogen.

8. Parasiticidal materials corresponding to the general formula $$R-\underset{\underset{O}{\|}}{C}-O-CH_2-CH_2-NH-\underset{\underset{O}{\|}}{C}-CH_2-hal$$

wherein $$R-\underset{\underset{O}{\|}}{C}$$

is an aliphatic acyl radical containing at least eight carbon atoms, Y is a member selected from the group consisting of hydrogen, alkyl, cycloalkyl, alkoxyl, aralkyl, aryl, and alkylol, and hal is halogen.

9. A composition comprising kerosene and a parasiticidal material corresponding to the formula $$R-\underset{\underset{O}{\|}}{C}-O-alk-NY-CO-(CH_2)_x-hal$$

wherein $$R-\underset{\underset{O}{\|}}{C}$$

is an aliphatic acyl radical containing at least eight carbon atoms, alk is a member selected from the class consisting of alkylene and arylene and substitution products thereof, Y is a member selected from the group consisting of hydrogen, alkyl, cycloalkyl, alkoxyl, aralkyl, aryl and alkylol, hal is halogen, and $x$ is a number ranging from one to four.

10. Parasiticidal materials corresponding to the formula $$C_{11}H_{23}-\underset{\underset{O}{\|}}{C}-O-C_2H_4-NH-CO-CH_2-hal$$

wherein hal is a member of the group consisting of chlorine and bromine.

11. Parasiticidal materials corresponding to the general formula $$(RO)_n-(alk-NY)_m-CO-Z(X)_w$$
$$\qquad\qquad\qquad\qquad\ \ |$$
$$\qquad\qquad\qquad\qquad CO-OY'$$

wherein R is an organic radical containing at least four carbon atoms, alk is a member selected from the group consisting of alkylene and arylene and substitution products thereof, Y is a member selected from the group consisting of hydrogen, alkyl, cycloalkyl, alkylol, alkoxyl, aralkyl, and aryl, Z is the residue of a polycarboxylic acid, Y' is a member selected from the group consisting of cations, lower alkyls, cycloalkyls, and aliphatic polyhydric alcohol radicals, X is halogen, and $n$, $m$ and $w$ are small whole numbers.

12. Parasiticidal materials corresponding to the general formula $$\qquad\qquad\qquad\qquad\qquad hal$$
$$\qquad\qquad\qquad\qquad\qquad\ |$$
$$RO-alk-NY-CO-CH_2-CH-COOM$$

wherein R is an aliphatic radical containing from eight to eighteen carbon atoms, alk is alkylene, Y is a member selected from the group consisting of hydrogen, alkyl, cycloalkyl, alkoxyl, aralkyl, aryl, and alkylol, hal is halogen, and M is a cation.

13. Parasiticidal materials corresponding to the general formula $$\qquad\qquad\qquad\qquad\qquad CH_2-COOM$$
$$\qquad\qquad\qquad\qquad\qquad\ |$$
$$R-CO-O-alk-NH-CO-CH-hal$$

wherein R—CO is an acyl radical containing at least eight carbon atoms, alk is alkylene, hal is halogen, and M is a cation.

14. Parasiticidal materials corresponding to the general formula $$R-CO-O-C_2H_4-NH-CO-CH-Cl$$
$$\qquad\qquad\qquad\qquad\qquad\ \ |$$
$$\qquad\qquad\qquad\qquad\qquad CH_2-COOM$$

wherein R—CO is an aliphatic acyl radical containing from eight to eighteen carbon atoms, and M is a cation.

15. Parasiticidal materials having the formula $$C_{11}H_{23}-CO-O-C_2H_4-NH-CO-CH-Cl$$
$$\qquad\qquad\qquad\qquad\qquad\qquad\ \ |$$
$$\qquad\qquad\qquad\qquad\qquad\quad CH_2-COOM$$

wherein M is a cation.

16. A composition comprising kerosene and a parasiticidal material corresponding to the formula $$RO-(alk-NH)_m-CO-CH-hal$$
$$\qquad\qquad\qquad\qquad\ \ |$$
$$\qquad\qquad\qquad\quad CH_2-COOM$$

wherein R is a radical selected from the group consisting of alkyl and acyl radicals containing from four to eighteen carbon atoms, alk is alkylene, $m$ is a small whole number, hal is halogen, and M is a cation.

17. A composition comprising an organic liquid and a parasiticidal material corresponding to the formula $$RO-(CH_2-CH_2-NH)_m-CO-CH-Cl$$
$$\qquad\qquad\qquad\qquad\qquad\qquad\ \ |$$
$$\qquad\qquad\qquad\qquad\qquad\ CH_2-COOM$$

wherein R is a radical selected from the group consisting of acyl and alkyl radicals containing at least eight carbon atoms, $m$ is a small whole number, and M is a cation.

18. Parasiticidal materials in accordance with the formula $$R-\underset{\underset{O}{\|}}{C}-O-(CH_2-CH_2-NH)_m-CO-CH-Cl$$
$$\qquad\qquad\qquad\qquad\qquad\qquad\qquad\ \ |$$
$$\qquad\qquad\qquad\qquad\qquad\qquad CH_2-COOM$$

wherein $$R-\underset{\underset{O}{\|}}{C}$$

is a fatty acid acyl radical containing from eight to eighteen carbon atoms, $m$ is a small whole number, and M is a cation.

19. A parasiticidal emulsion comprising an aqueous phase and a water-repelling phase, and including a chemical compound corresponding to the general formula $$(RO)_n\text{—}(alk\text{—}NY)_m\text{—}CO\text{—}Z(X)_w$$

wherein R is an organic radical containing at least four carbon atoms, alk is a member selected from the group consisting of alkylene and arylene and substitution products thereof, Z is a member selected from the class consisting of hydrocarbon radicals and substitution products thereof, Y is a member selected from the group consisting of hydrogen, alkyl, cycloalkyl, alkoxyl, aralkyl, aryl, and alkylol, $n$, $m$ and $w$ are small whole numbers, and X is halogen.

20. A parasiticidal emulsion comprising an aqueous phase and an oleaginous phase, and including a chemical compound corresponding to the general formula $$\left(R\text{—}\underset{\underset{O}{\|}}{C}\text{—}O\text{—}\right)_n\text{—}alk\text{—}\underset{Y}{N}\text{—}\underset{\underset{O}{\|}}{C}\text{—}Z(X)_w$$

wherein $$R\text{—}\underset{\underset{O}{\|}}{C}$$

is an aliphatic acyl radical containing at least eight carbon atoms, alk is alkylene, Y is a member selected from the group consisting of hydrogen, alkyl, cycloalkyl, alkoxyl, aralkyl, aryl, and alkylol, Z is a hydrocarbon residue, X is halogen, and $n$ and $w$ are small whole numbers.

ALBERT K. EPSTEIN.
BENJAMIN R. HARRIS.